United States Patent Office 3,407,162
Patented Oct. 22, 1968

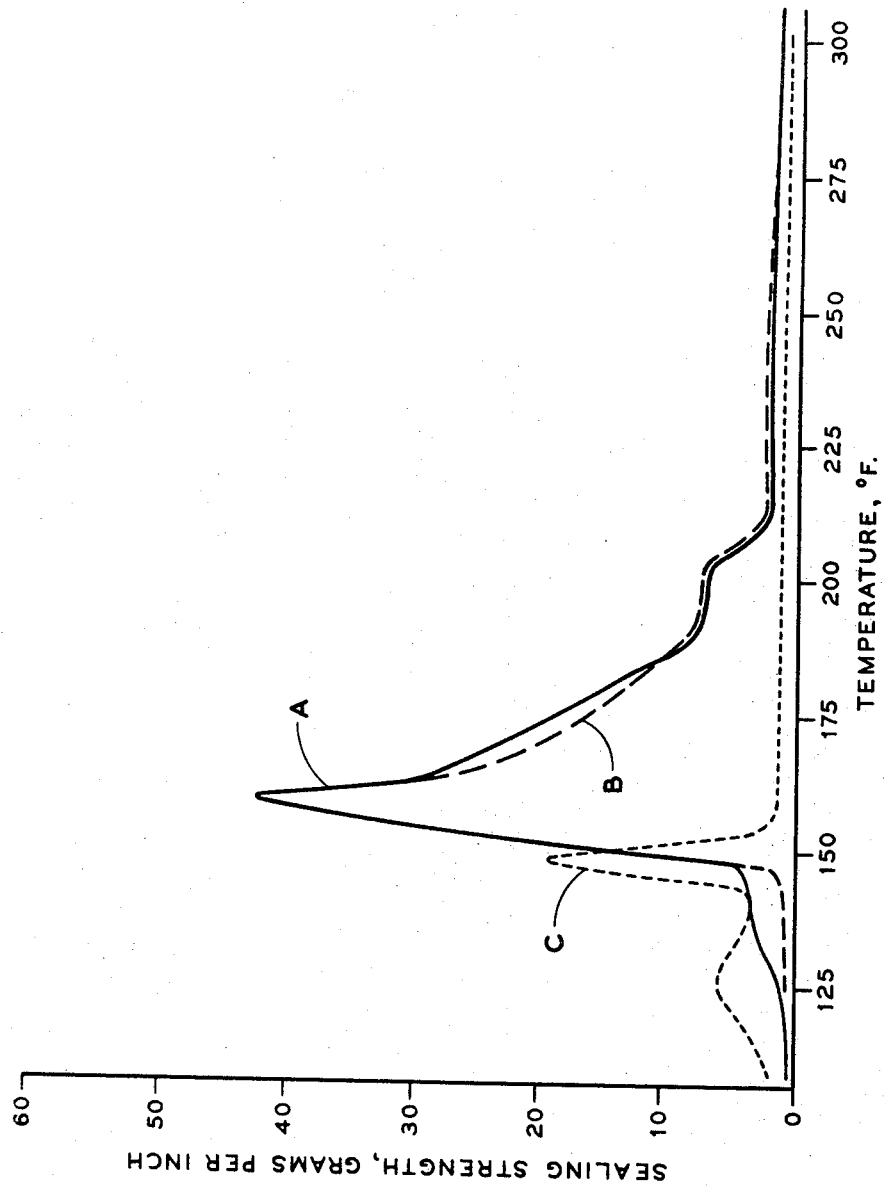

3,407,162
HOT TACK HIGH GLOSS WAX COMPOSITIONS
Victor A. Rundle, Oakland, Calif., assignor to Chevron Research Company, San Francisco, Calif., a corporation of Delaware
Filed Mar. 30, 1966, Ser. No. 538,702
4 Claims. (Cl. 260—28.5)

ABSTRACT OF THE DISCLOSURE

Hot tack is enhanced in wax compositions by the addition of straight chain polyethylene and ethylene-vinyl acetate copolymers. Gloss is additionally improved by the addition of alkylene bis-fatty acid amides.

This invention concerns novel wax containing compositions which find use as coating compositions. More particularly, this invention concerns novel wax containing compositions having superior physical properties as coating compositions.

Numerous patents have issued describing various wax compositions containing polymeric materials. A number of patents have issued describing the use with waxes of ethylene-vinyl acetate copolymers and of polyethylene, both of various molecular weights, either separately or in combination. See for example U.S. Patents Nos. 3,146,214 and 3,205,186.

The use of wax as a coating composition in competition with the numerous other materials which are available today has put increasing demands on the properties of wax compositions. While wax has a number of attractive features—availability, cost, low water vapor transmission rate—it also has many deficiencies. For example, the sealing strength between a variety of materials, e.g., paper or cardboard, is not as high as desirable. Sealing strength is divided into two parts. The most obvious is the strength of the seal when the wax is cold. However, a second part is the "hot tack," which is the strength at which two objects are held together at an elevated temperature. Hot tack is the ability of a heat activated sealant to maintain sufficient sealing strength in the molten state to hold the two surfaces being sealed together until the sealant cools and attains its full strength. This is important, because hot tack is a measure of how well the wax will hold the two objects together, while the wax is still quite warm and relatively fluid, after the objects have been contacted and are no longer being restrained from separating. A high hot tack is desirable, since sealing can be done more rapidly and efficiently.

Another wax deficiency is its low air cooled gloss. This is particularly true with the ethylene-vinyl acetate containing wax compositions.

Pursuant to this invention, wax compositions are provided having high gloss, both air cooled and water quenched, excellent sealing strength, both cold seals and hot tack, and are of sufficiently low viscosity to be used in curtain coating, web coating, roller coating, etc. The composition comprises from about 65 to 84 percent by weight of a paraffinic or microcrystalline wax, from about 15 to 25 percent by weight of an ethylene-vinyl acetate copolymer, and from about 3 to 10 percent by weight of polyethylene. Preferably, from about 0.2 to 1.5 percent by weight of N,N-di(hydrocarbyloyl) alkylene diamine is also present. (Hydrocarbyloyl is an organic radical bonded to a non-oxo carbonyl, wherein the organic radical is composed solely of carbon and hydrogen and may be aliphatic, aromatic, alicyclic or combinations thereof, e.g., aralkyl.)

The accompanying figure is a graph comparison of the sealing properties of three different wax compositions.

The paraffin or microcrystalline waxes will be relatively high melting. That is, the AMP will be in the range of about 145 to 200, more usually in the range of about 155 to 185. The oil content of the waxes will usually be relatively low, generally less than 1 weight percent. While for the most part, about 65 to 84 weight percent wax will be used, preferably from about 72 to 81 weight percent wax will be used.

The polyethylene used will be relatively straight chain and of from about 15,000 to 25,000 molecular weight, more usually from about 18,000 to 22,000 molecular weight. For the most part, these are average molecular weights with a major portion of the polymer having molecular weights close to the average.

The polyethylene will generally be present in from about 3 to 10 weight percent of the wax composition, preferably from about 4 to 6 weight percent.

The ethylene-vinyl acetate copolymer (EVA) has a melt index of from about 1.6 to 50, usually from about 2 to 40. The number percent of vinyl acetate molecules will be in the range of about 15 to 35 percent, more usually from about 20 to 30 percent. These polymers are commercially available from the E. I. du Pont de Nemours & Company under the trade name Elvax.

The ethylene-vinyl acetate copolymer will be present in the wax composition in amounts of from about 15 to 25 weight percent, usually in amounts of from about 15 to 22 weight percent. Greatly superior compositions are those having the polyethylene and ethylene-vinyl acetate copolymer present in combined amount of from 19 to 24 weight percent of the composition.

Surprisingly, significant enhancement of the properties—particularly gloss—of the compositions of this invention is achieved by the addition of small amounts of N,N-di(hydrocarbyloyl) alkylene diamine. For the most part, the hydrocarbyloyl group is an aliphatic acyl radical, either aliphatically unsaturated or saturated.

The N,N-di(aliphatic hydrocarbyloyl) alkylene diamine has the following formula:

RCONHANHCOR¹ wherein R and R¹ are aliphatic hydrocarbyl of from 14 to 24 carbon atoms, either the same or different, and A is alkylene of from 1 to 6 carbon atoms. Usually, R and R¹ will be of from 16 to 20 carbon atoms and have the same number of carbon atoms. The alkylene group A will usually be of from about 1 to 3 carbon atoms.

Illustrative compounds include the distearamide of methylene diamine, the dioleoylamide of ethylene diamine, the distearamide of propylene diamine, the dipalmitic acid amide of ethylene diamine, diarachidic acid amide of methylene diamine, monopalmitic monostearic diamide of propylene diamine, etc.

Usually, the N,N-di(aliphatic hydrocarbyloyl) alkylene diamine will be present in from about 0.2–1.5 weight percent of the composition, more usually from about 0.5 to 1.2 weight percent of the compositions. Individual compounds or mixtures of compounds may be used.

Other additives may also be present in minor amounts. Such additives include dyes, antioxidants, etc., generally in amounts of from about 0.0015 to 2 weight percent of the composition.

The wax compositions are readily prepared according to known methods. The particular method of blending the various ingredients is not critical to this invention as long as significant homogeneity is achieved and the blending temperature is controlled so as not to exceed the thermal stability limits of the N,N-di(hydrocarbyloyl) alkylene diamine.

As previously indicated, the wax compositions may be coated onto paper, fiberboard, carton board, corrugated, glassine, etc. by any of the common coating means used in the art. The viscosities of the compositions are sufficiently low to permit curtain coating as well as other methods of coating which are not as viscosity sensitive. Usually, the coatings will be from about 0.5 to 3 mil thickness. The coatings provide particularly enhanced properties with thickness of from about 1 to 2 mils.

With the compositions of this invention, good to excellent gloss ratings are obtained with both air and water quenching. Moreover, the gloss is stable for long periods of time.

In order to demonstrate the excellent properties of the compositions of this invention, the gloss was determined as follows: two mil coatings were made on bread wrap with a Bird applicator (draw down blade) using a steel plate under the bread wrap. Gloss readings were made with the Gardner 60° gloss meter. The following table, Table I, indicates the results obtained for air cooled gloss.

TABLE I

| Example | I | II | III | IV | Control |
|---|---|---|---|---|---|
| Weight Percent: | | | | | |
| Wax, AMP: | | | | | |
| 154/156 | 79.9 | 78.9 | | | 79.9 |
| 160/165 | | | 79.9 | 78.9 | |
| Polyethylene [1] | 5 | 5 | 5 | 5 | |
| Ethylene-vinyl acetate copolymer [2] | 15 | 15 | 15 | 15 | 20 |
| N,N'-dioleyl ethylene diamide | | 1 | | 1 | |
| BHT [3] | .1 | .1 | .1 | .1 | .1 |
| Gloss Reading | 64 | 81/86 | 69 | 81/90 | 33 |

[1] Polyethylene of ~20,000 mol. wt. (sold as Alathon 10 by E. I. du Pont Co.).
[2] Elvax 260: Melt Index =~5-7 g./10 min.; percent vinyl acetate=27–29.
[3] A commercial antioxidant—butylated hydroxy toluene.

In order to demonstrate the sealing strength both as to hot tack and cold seal, the following apparatus was devised: a temperature gradient plate is supported on a four wheel underframe with the wheels sitting on a wooden support and set in a fixed race or channel. The wooden support is placed in an Instron apparatus at right angles to the Instron crossarm. The Instron apparatus provides a means of measuring load versus deflection. In the present instance the Instron apparatus measures the load necessary for delamination. A pulley and cord arrangement is attached to the support and draws the temperature gradient plate horizontally at a rate equal to the downward rate of the Instron crossarm. The delaminating strip is thereby maintained in a vertical position (right angle to the gradient hot plate) throughout the test. Thus, the force measured by the Instron apparatus is the force required to pull the test strip from the gradient plate at the temperature of the plate directly beneath the strip holder.

The gradient plate should have a temperature range of from about 100° to 500° F., generally not less than from about 100° to 300° F. The wax composition or the material to be tested is coated onto a strip of the desired material, for example, an aluminum foil strip and then drawn down to a constant thickness. A convenient strip width is from about 1 to 3 cm. If the sealing strength to aluminum is desired, the temperature gradient plate can conveniently be made of aluminum. If the sealing strength to another material is desired, such material may be bonded or affixed in any convenient manner to the surface of the temperature gradient plate. The same material may be used for the strip which is coated with the wax composition. The coated strip is placed along the length of the temperature gradient plate—the direction of the temperature gradient. The strip should be long enough that from the point of the highest temperature to be tested, the strip may be attached to a clip or other connecting means to the upper arm of the Instron apparatus. A small rod or other convenient indicator may be placed over the strip along the line of the highest temperature to be tested, so that the run begins at the same temperature in each run.

The run may now be initiated by lowering the Instron crossarm at a constant rate. The pulley and cord arrangement, regulated to the lowering rate of the Instron crossarm, maintains the strip in a vertical position (at right angles to the temperature gradient plate) throughout the test.

While different Instron crossarm speeds may be used, a speed of 50 inches per minute has been found to be satisfactory for blends having viscosities above about 800 centipoises at 250° F. For blends having lower viscosities, higher speeds would probably be desirable. The curves obtained can indicate hot tack and/or sealing strength depending on the method of affixing the test strip. Relative hot tack is indicated by comparing the height and slope of the curve between the sealing temperature—the temperature of the coating during sealing in a commercial package sealing machine—and maximum strength (peak). The peak appears to correspond to the melting point of the blend. The more rapidly the curve rises, the better the hot tack, and the better will the seal be held when two objects are brought together and the pressure released which is holding them together. The cold sealing strength is indicated at temperatures below about 115° F. on curves of samples which have been heat sealed to the gradient plate and then allowed to cool to the gradient plate temperature. For sealing strength at lower temperatures, the entire temperature gradient plate can be allowed to cool to the desired temperature.

In carrying out the test, a 1 inch wide strip of 1 mil thick aluminum foil 11 inches long is coated with a 1 mil coating of the blend to be tested and pressed directly onto the gradient heat plate. The excess foil, 2 inches, is placed in the Instron jaw so that it is taut and vertical to the plate. The temperature of the plate at the point of initial contact with the foil is noted as a reference point on the Instron chart.

The accompanying figure compares curves obtained from compositions within the scope of this invention and a curve of a prior art composition (having less of the polymeric materials) which is reported as having excellent sealing strength. The three wax compositions had the following components:

| | A | B | C |
|---|---|---|---|
| Weight Percent: | | | |
| Wax, 154/156 AMP | 80 | 79 | 90.625 |
| Polyethylene [1] | 15 | 15 | 0.375 |
| Ethylene-vinyl acetate copolymer [2] | 5 | 5 | 8.0 |
| N,N'-dioleyl ethylene diamide | | 1 | |

[1] Alathon 10.
[2] Elvax 250: Melt Index=12–18; percent vinyl acetate =27–29.

It is evident from the curves that the prior art composition shows little hot tack strength and would be relatively ineffective in maintaining the seal, where there is a counter force separating the two surfaces to be sealed. Also, sealing strength is much lower. (The sealing strength drops off below the melting point because little, if any, sealing occurs when the strip is placed on the gradient plate at temperatures below the melting point.)

The test results demonstrate that the compositions of this invention provide excellent wax compositions having superior properties as coating compositions. Not only do they have good hot tack and sealing strength, excellent gloss, further enhanced by the addition of a small amount of diamide, but they also show good scuff resistance and satisfactory viscosities.

As will be evident to those skilled in the art, various modifications on this invention can be made or followed, in the light of the foregoing disclosure and discussion, without departing from the spirit or scope of the disclosure or from the scope of the following claims.

I claim:
1. A wax composition having superior cold sealing strength and hot tack useful in the coating of paper which comprises from 65 to 84 weight percent of a paraffinic or microcrystalline wax having an AMP in the range of about 145 to 200, from 3 to 10 weight percent of relatively straight chain polyethylene of a molecular weight in the range of about 15,000 to 25,000, and from 15 to 25 weight percent of an ethylene-vinyl acetate copolymer having a melt index in the range of about 1.6 to 50 and having from 15 to 35 percent vinyl acetate and from about 0.2 to 1.5 weight percent N,N-(di(aliphatic hydrocarbylol) alkylene diamine of the formula:

RCONHANHCOR¹ wherein R and R¹ are aliphatic hydrocarbyl of from 14 to 24 carbon atoms and A is alkylene of from 1 to 6 carbon atoms.

2. A composition according to claim 1, wherein R and R¹ are of from 16 to 20 carbon atoms and A is alkylene of from 1 to 3 carbon atoms.

3. A composition according to claim 1, having from 72 to 81 weight percent wax, from 4 to 6 weight percent polyethylene of from about 18,000 to 22,000 molecular weight, and from 15 to 22 weight percent ethylene-vinyl acetate copolymer having a melt index in the range of from about 2 to 40 and from 20 to 30 percent vinyl acetate.

4. A method of preparing a high gloss strong stealing wax coating onto paper which comprises coating paper with a wax composition according to claim 1 in from about 0.5 to 3 mil thickness.

References Cited

UNITED STATES PATENTS

| | | | |
|---|---|---|---|
| 3,245,930 | 4/1966 | McDowell | 260—28.5 |
| 3,205,186 | 9/1965 | Zaayenga | 260—28.5 |
| 3,146,214 | 8/1964 | Jakaitis | 260—28.5 |
| 3,165,492 | 1/1965 | Tholstrup | 260—28.5 |
| 2,765,293 | 10/1956 | Happoldt | 260—28.5 |
| 2,803,612 | 8/1957 | Moyer | 260—28.5 |
| 3,061,493 | 10/1962 | Anderson | 260—28.5 |
| 2,938,879 | 5/1960 | Mock | 260—32.6 |

MORRIS LIEBMAN, *Primary Examiner.*

B. A. AMERNICK, *Assistant Examiner.*